(12) United States Patent
Zhong et al.

(10) Patent No.: US 8,448,228 B2
(45) Date of Patent: May 21, 2013

(54) SEPARATING AUTHORIZATION IDENTITY FROM POLICY ENFORCEMENT IDENTITY

(75) Inventors: Yuhui Zhong, Sammamish, WA (US); Gregory Kostal, Kirkland, WA (US); Tejas D. Patel, Seattle, WA (US); Scott C. Cottrille, Sammamish, WA (US); Vladimir Yarmolenko, Duvall, WA (US); Pankaj Mohan Kamat, Kirkland, WA (US); Sunitha Samuel, Kirkland, WA (US); Frank D. Byrum, Seattle, WA (US); Mayank Mehta, Redmond, WA (US); Chandresh Kumar Jain, Sammamish, WA (US); Edward Banti, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 12/893,763

(22) Filed: Sep. 29, 2010

(65) Prior Publication Data

US 2012/0079268 A1    Mar. 29, 2012

(51) Int. Cl.
*H04L 29/06*          (2006.01)

(52) U.S. Cl.
USPC .............. 726/5; 713/156; 713/165; 713/167; 713/182; 713/185

(58) Field of Classification Search
USPC .......................................................... 726/5
See application file for complete search history.

(56) References Cited

U.S. PATENT DOCUMENTS

| | | | |
|---|---|---|---|
| 6,073,242 A * | 6/2000 | Hardy et al. ...................... 726/1 |
| 7,500,097 B2 | 3/2009 | Kostal | |
| 7,523,310 B2 | 4/2009 | Narin | |
| 2002/0107806 A1 * | 8/2002 | Higashi et al. .................. 705/51 |
| 2004/0073518 A1 * | 4/2004 | Atkinson et al. ................ 705/65 |
| 2004/0073801 A1 * | 4/2004 | Kalogridis et al. ........... 713/176 |
| 2005/0097359 A1 * | 5/2005 | Speare et al. ................. 713/201 |
| 2005/0216418 A1 * | 9/2005 | Davis et al. ..................... 705/59 |
| 2007/0011750 A1 | 1/2007 | Davis | |
| 2009/0138319 A1 * | 5/2009 | Ratnala ............................ 705/9 |
| 2009/0192942 A1 | 7/2009 | Cottrille | |
| 2009/0260054 A1 | 10/2009 | Bryce | |
| 2009/0300712 A1 | 12/2009 | Kaufmann | |
| 2010/0186062 A1 | 7/2010 | Banti | |

OTHER PUBLICATIONS

Hayton et al., Access Control in an Open Distributed Environment, May 1998, Proceedings of IEEE Symposium on Security and Privacy, pp. 3-14.*
Rosset et al., A DRM architecture to distribute and protect digital contents using digital licenses, Jul. 2005, Proceedings of the Advanced Industrial Conference on Telecommunications/Service Assurance with Partial and Intermittent Resources Conference, pp. 422-427.*
Microsoft Technet, "How to Set Up FIM CM Active Directory Permissions", Mar. 31, 2010, 6 pages.

* cited by examiner

*Primary Examiner* — Taghi Arani
*Assistant Examiner* — Kenneth Chang
(74) *Attorney, Agent, or Firm* — Workman Nydegger (57) ABSTRACT

The present invention extends to methods, systems, and computer program products for separating authorization identity from policy enforcement identity. Embodiments of the invention extend the consumption phase for protected information. Two identities, an authorization identity and a policy enforcement identity, are used for acquiring, issuing and enforcing usage license instead of one identity certificate. The authorization identity is used to evaluate against usage policy. The authorization identity is similar to identification information in an identity certificate. The policy enforcement identity is used to ensure the confidentiality of granted permissions and content key. The policy enforcement identity enforces a usage license on an authorization principal's (e.g., recipient's) machine. The policy enforcement identity's enforcement of a usage license is similar use of a cryptographic key in an identity certificate.

20 Claims, 3 Drawing Sheets

SEPARATING AUTHORIZATION IDENTITY FROM POLICY ENFORCEMENT IDENTITY

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many computing environments, a Rights Management System ("RMS") is used to protect information. Information protection can include a provisioning process for each participating principal. The provisioning process consists of the authentication and identification of a principal, and the generation and storage of cryptographic key for him/her. The principal's identification and cryptographic key are statically bound together as identity certificate. The identity certificate is signed by an information protection authority, making it tamper resistant. The identity certificate is distributed to the principal for publishing and consuming content. The identity certificate is often associated with policy enforcement software.

Information protection can also include publishing protected information. During the creation of protected information, a usage policy is specified. The usage policy describes a set of principals and the types of access they have. A usage policy typically includes a content key that is used to encrypt the protected information.

To obtain access to protected information, a recipient's identity certificate and the protected information's usage policy are submitted to an authorization server. The authorization server evaluates the identification information in the identity certificate against the usage policy to determine whether the recipient is authorized to access the content, what types of access the recipient has and under what conditions. If the recipient is granted to any permission, a usage license is issued. The cryptographic key inside of the identity certificate is used to encrypt the granted accesses and the content key encrypting the protected information such that only the authorized recipient can access the content.

The usage license is bound to the cryptographic key contained in the identity license on recipient side. The protected information is decrypted. The granted accesses and conditions are enforced.

Unfortunately, the typical RMS provisioning process is required for every principal who wants to participate in the information protection workflow. Provisioning involves expensive operations like generating and safely storing cryptographic keys. This expense grows dramatically as enterprises collaborate with other enterprises, thereby expanding the participant base beyond the enterprise boundary.

The typical RMS provisioning process also assumes policy enforcement software is available on each participant's machine. The software understands and is able to enforce usage license issued by authorization server. This imposes challenges since a principal may use various applications on various different platforms.

Further, an enterprise may want to apply central control operations on the incoming/outgoing protected information. For example, an enterprise many have a central receiving server that scans for malware. However, under typical RMS provisioning this is not supported. The content key and granted permissions are encrypted by the identity certificate which is not usable at the central server. Additionally, typical RMS has no mechanism to delegate appropriate permissions to the central server to facilitate central control operations.

BRIEF SUMMARY

The present invention extends to methods, systems, and computer program products for separating authorization identity from policy enforcement identity. Embodiments include issuing a usage license for protected content directed to the authorization principal. An authorization (e.g., a Rights Management System ("RMS")) server receives a usage license request from a policy enforcement principal on behalf of an authorization principal (e.g., a recipient).

The usage license request requests a usage license for the authorization principal to access the protected content. The usage license request includes an authorization identity statement for the authorization principal and a policy enforcement certificate. The authorization identity statement contains identity information identifying the authorization principal. The policy enforcement certificate contains a policy enforcement identity statement and a cryptographic key. The policy enforcement identity statement contains identity information identifying the policy enforcement principal. The cryptographic key is provisioned for the policy enforcement principal.

The authorization server accesses coupling information. The coupling information is usable to determine that the policy enforcement principal is coupled to the authorization principal and that the policy enforcement principal is trusted to request a usage license on behalf of the authorization principal. The authorization server also accesses a usage policy for the protected content.

The authorization server verifies that the policy enforcement principal is permitted to request the usage license on behalf of the authorization principal based on the coupling information. The authorization server verifies that unwanted permission elevation is not to occur based on the coupling between the policy enforcement principal and the authorization principal.

The authorization server formulates a usage license by evaluating the authorization principal against the contents of the usage policy. The usage license includes permissions granted to the authorization principal and a content key. The usage license, including the granted permissions and content key, is encrypted with the cryptographic key provisioned for the policy enforcement principal. The encrypted usage license is returned to the policy enforcement principal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for separating authorization identity from policy enforcement identity. Embodiments include issuing a usage license for protected content directed to the authorization principal. An authorization (e.g., a Rights Management System ("RMS")) server receives a usage license request from a policy enforcement principal on behalf of an authorization principal (e.g., a recipient).

The usage license request requests a usage license for the authorization principal to access the protected content. The usage license request includes an authorization identity statement for the authorization principal and a policy enforcement certificate. The authorization identity statement contains identity information identifying the authorization principal. The policy enforcement certificate contains a policy enforcement identity statement and a cryptographic key. The policy enforcement identity statement contains identity information identifying the policy enforcement principal. The cryptographic key is provisioned for the policy enforcement principal.

The authorization server accesses coupling information. The coupling information is usable to determine that the policy enforcement principal is coupled to the authorization principal and that the policy enforcement principal is trusted to request a usage license on behalf of the authorization principal. The authorization server also accesses a usage policy for the protected content.

The authorization server verifies that the policy enforcement principal is permitted to request the usage license on behalf of the authorization principal based on the coupling information. The authorization server verifies that unwanted permission elevation is not to occur based on the coupling between the policy enforcement principal and the authorization principal.

The authorization server formulates a usage license by evaluating the authorization principal against the contents of the usage policy. The usage license includes permissions granted to the authorization principal and a content key. The usage license, including the granted permissions and content key, is encrypted with the cryptographic key provisioned for the policy enforcement principal. The encrypted usage license is returned to the policy enforcement principal.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention extend the consumption phase for protected information. Two identities, an authorization identity and a policy enforcement identity, are used for acquiring, issuing and enforcing usage license instead of one identity. The authorization identity is used to evaluate against usage policy. The authorization identity is similar to identification information in an identity certificate. The policy enforcement identity is used to ensure the confidentiality of the granted permissions and content key. The policy enforcement identity enforces a usage license on an authorization principal's (e.g., recipient's) machine. The policy enforcement identity's enforcement of a usage license is similar use of a cryptographic key in an identity certificate.

Embodiments of the invention include mechanisms to improve the content consumption phase of the information protection workflow. An authorization identify can be separated from a policy enforcement identity during usage license generation. Separating an authorization identify from a policy enforcement identity can lower total cost of ownership via simplified provisioning. An authorization entity and a policy enforcement identity can also be dynamically coupled at usage license generation time. Dynamically coupling an authorization entity and a policy enforcement identity can achieve desired security assurances and flexibility. Together, these mechanisms support more advanced techniques for generation usage license generation (e.g., centralized enterprise control for auditing and permission delegation purposes) that both adhere to established security assurance levels and reduce total cost of ownership via provisioning simplifications.

Figure 1:
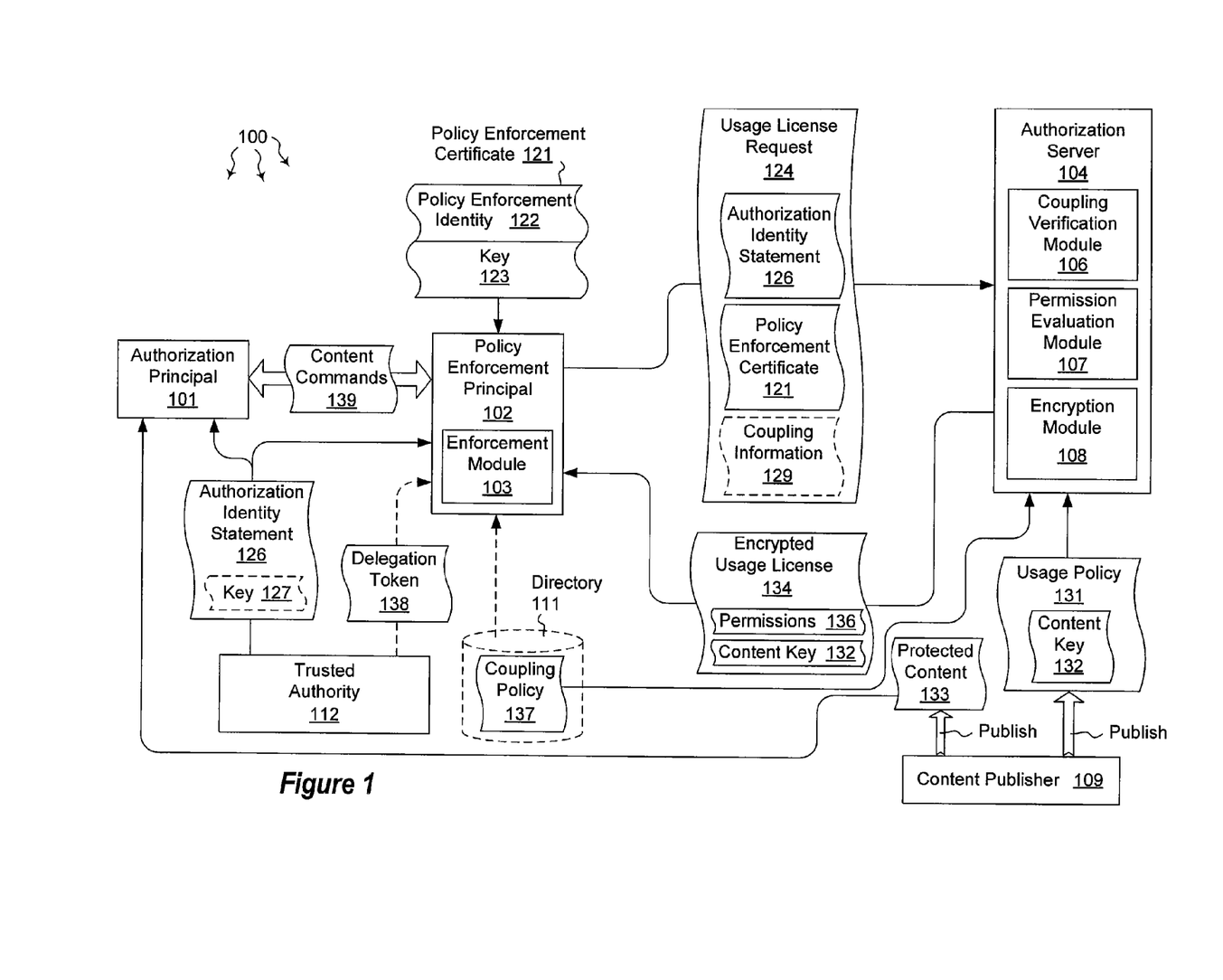
FIG. 1 illustrates an example computer architecture that facilitates separating authorization identity from policy enforcement identity

FIG. 1 illustrates an example computer architecture 100 that facilitates separating authorization identity from policy enforcement identity. Referring to FIG. 1, computer architecture 100 includes authorization principal 101, policy enforcement principal 102, authorization server 104, content publisher 109, and trusted authority 112. Each of the depicted components can be connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Content publisher 109 can publish protected content 133. Protected content 133 can be protected in accordance with published usage policy 131. Protected content 133 can be encrypted using content key 132. Usage policy 131 can define rights for accessing protected content 133, including permissions 136, and can include content key 132 for decrypting protected content 133.

Generally, policy enforcement principal 102 is configured to acquire and bind a usage license on behalf of an authorization principal (e.g., authorization principal 101). For example, policy enforcement principal 102 can request and acquire a usage license on behalf of an authorization principal and then enforce the acquired usage license on the authorization principal's machine.

Figure 2:
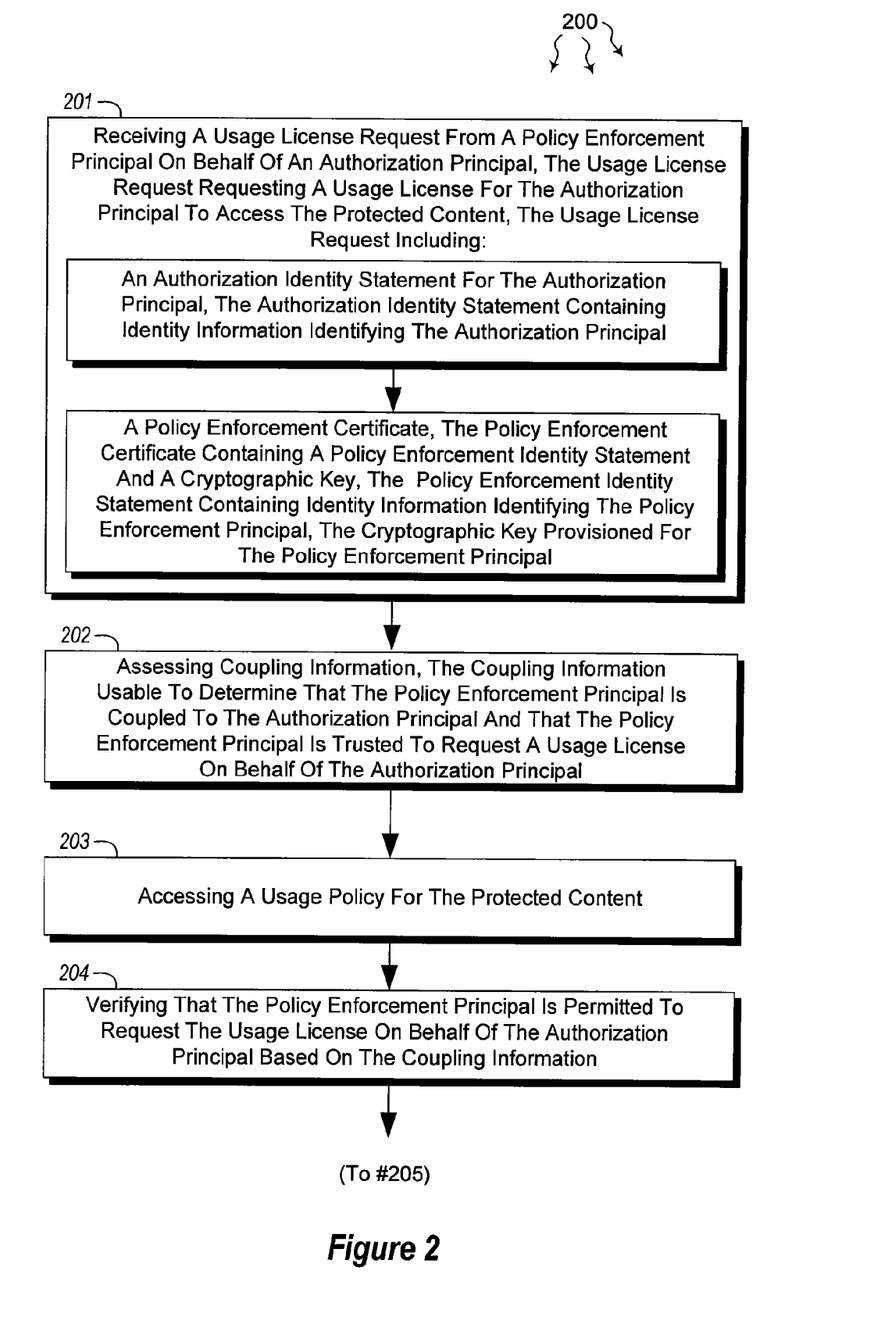
FIG. 2 illustrates a flow chart of an example method for issuing a usage license for protected content directed to the authorization principal.

FIG. 2 illustrates a flow chart of an example method 200 for issuing a usage license for protected content directed to the authorization principal. Method 200 will be described with respect to the components and data of computer architecture 100.

Method 200 includes an act of receiving a usage license request from a policy enforcement principal on behalf of an authorization principal, the usage license request requesting a usage license for the authorization principal to access the protected content (act 201). For example, policy enforcement principal 102 can send usage license request 124 to authorization server 104 on behalf of authorization principal 101. Authorization server 104 can receive usage license request 124 from policy enforcement principal 102. Usage license request 124 can be a request to acquire a usage license for protected content 133.

The usage license request can include an authorization identity statement for the authorization principal, the authorization identity statement containing identity information identifying the authorization principal. For example, usage license request 124 can include authorization identify statement 126. Authorization identify statement 126 can contains identity information representing authorization principal 101.

Authorization identity statement 126 can be issued by trusted authority 112. Authorization identity statement 126 can be in the form of a Security Assertion Markup Language ("SAML") token, an eXtensible Rights Markup Language ("XrML") certificate, an X.509 certificate, a Kerberos token, etc. Authorization identity statement 126 can also include key 127. Key 127 can be used to sign coupling information that couples authorization principal and policy enforcement principal. Key 127 can be trusted by authorization server 104 and thus can be used to validate the signature and coupling information. Authorization identity statement 126 can be obtained outside of mechanisms for provisioning a rights management principal.

The usage license request can include a policy enforcement certificate, the policy enforcement certificate containing a policy enforcement identity statement and a cryptographic key, the policy enforcement identity statement containing identity information identifying the policy enforcement principal, the cryptographic key provisioned for the policy enforcement principal. For example, usage license request 124 can include policy enforcement certificate 121. Policy enforcement certificate 121 includes policy enforcement identity 122 and key 123. Policy enforcement certificate 121 can be obtained from a Rights Management System ("RMS") using mechanisms for provisioning a rights management principal.

Method 200 includes an act of accessing coupling information, the coupling information usable to determine that the policy enforcement principal is coupled to the authorization principal and that the policy enforcement principal is trusted to request a usage license on behalf of the authorization principal (act 202). In some embodiments, a coupling relationship is established before use license request and acquisition. The coupling relationship can be saved into directory accessible to authorization server. For example, coupling policy 137 can be saved in directory 111 that is accessible to authorization server 104. Coupling policy 137 can define that enforcement principal 102 is coupled to the authorization principal 101 and that the policy enforcement principal 102 is trusted to request a usage license on behalf of the authorization principal 101.

An authorization server, such as, for example, authorization server 104, can organize coupling authorization policy locally, in advance of any request, in any of a number of different ways. In some embodiments, an authorization server maintains an enterprise-wide coupling policy. One example of an enterprise-wide coupling policy includes using a known cryptographic key that can couple with any authorization identity satisfying certain pattern (e.g. any email address in specified domain). In other embodiments, an authorization server maintains an individual consent policy. For example, one user (e.g., an authorization principal) can expressly allow another user (e.g., a policy enforcement principal) to couple with their authorization identity by submitting a consent form to the authorization server.

Alternately, an authorization service can couple an authorization identity and policy enforcement identity at the time of usage license acquisition. When coupling is performed at the time of usage license acquisition, coupling information can be included in a usage license request. For example, coupling information 129 can be included in usage license request 124.

Coupling an authorization identity and policy enforcement identity at the time of usage license acquisition can be performed in any of a number of different ways. In some embodiments coupling is performed via delegation. For example, an authorization identity can grant a policy enforcement identity the permission to obtain a delegation token from trusted authority. The delegation token contains proof that an authorization identity and a policy enforcement identity are coupled together. For example, authorization principal 101 can grant policy enforcement identity 102 permission to obtain a token from trusted authority 112. In turn, policy enforcement principal 102 can obtain delegation token 138. Delegation token 138 provides proof that authorization principal 101 and policy enforcement principal 102 are coupled together. Delegation token 138 can be included in coupling information 129.

In other embodiments, coupling is performed via signing. When an authorization identity statement contains a cryptographic key known only to an authorization principal, the cryptographic key can be used to sign a coupling relationship. One implementation includes signing a policy enforcement identity. For example, authorization principal 101 can sign policy enforcement identity 122 using key 127. The signature can be represented in coupling information 129.

Various other variations can be extended to include preconditions (e.g. validity time, content identifier the coupling applies on etc). For example, when authorization identity is proven using an X.509 certificate, the private key of X.509 certificate (e.g., key 127) can be used to signs a digest of policy enforcement identity (e.g., policy enforcement identity 122). Alternately, when authorization identity is proven by a SAML token with Proof-Of-Possession ("POP") key, the POP key (e.g., key 127) can be used to sign the digest of policy enforcement identity (e.g., policy enforcement identity 122) and the validity interval for coupling. Alternately, when the authorization identity is an XrML identity certificate, the cryptographic key inside of the XrML identity certificate (e.g., key 127) can be used to sign the digest of policy enforcement identity (e.g., policy enforcement identity 122) and the protected content identifier.

Method 200 includes an act of accessing a usage policy for the protected content (act 203). For example, authorization server 104 can access usage policy 131 for protected content 133.

Method 200 includes an act of verifying that the policy enforcement principal is permitted to request the usage license on behalf of the authorization principal based on the coupling information (act 204). For example, coupling verification module 106 can verify that authorization principal 101 is coupled to policy enforcement principal 102. The mechanism for verifying a coupling can vary depending on the type of coupling information provided to authorization server 104. When coupling is performed via delegation, authorization server 104 can verify the existence of token 138 within coupling information 129. Alternately, when coupling is performed via signing, authorization server 104 can that policy enforcement identity 122 is signed by authorization principal 101 and all pre-conditions are satisfied. When an enterprise wide policy is used, authorization server 104 can verify that coupling policy 137 permits policy enforcement principal 102 to couple with authorization principal 101.

Method 200 includes an act of verifying that unwanted permission elevation is not to occur based on the coupling between the enforcement principal and the authorization principal (act 205). For example, coupling verification module 106 can verify that unwanted permission elevation does not occur based on the coupling between policy enforcement principal 102 and authorization principal 101. In some embodiments, coupling verification module 106 verifies that authorization principal 101 has a "CanDelegate" permission, which allows principal 101 to grant permission to other identities. This form of verification can be used when the coupling is based on authorization 101's discretion. "CanDelegate" permission can be expressly granted to authorization principal 101 in usage policy 131.

In other embodiments, coupling verification module 106 verifies that policy enforcement principal 102 has an "ActAs" permission, which allows policy enforcement principal 102 to access protected content as original identities. This form of verification can be used when the coupling is established by enterprise policy. "ActAs" permission can be granted to policy enforcement principal 102 independent of usage policy 131.

Method 200 includes an act of formulating a usage license by evaluating the authorization principal against the contents of the usage policy, the usage license including permissions granted to the authorization principal and a content key (act 206). For example, permission evaluation module 107 can formulate usage license 134 by evaluating authorization principal 101 against the contents of usage policy 131. Usage license 134 can include permissions 136 (granted to authorization principal 101) and content key 132.

Method 200 includes an act of encrypting usage license, including encrypting the granted permissions and content key with the cryptographic key provisioned for the policy enforcement principal (act 207). For example, encryption module 108 can encrypt usage license 134, including encrypting permissions 136 and content key 132, with cryptographic key 123. Method 200 includes an act of returning the encrypted usage license to the policy enforcement principal (act 208). For example, authorization server 104 can return encrypted usage license 134 to policy enforcement principal 102.

Upon receiving encrypted usage license 134, policy enforcement principal 102 can make protected content 133 available to authorization principal 101. Enforcement module 103 can enforce permissions 136 on content commands 139 issued form authorization principal 101.

Accordingly, embodiments of the invention permit a principal (e.g., an authorization principal) to consume protected content without provisioning. When protected content (e.g., a protected electronic message such as an electronic mail message, a voice mail, a Short Message Service "SMS") message, a Voice mail/SMS message, etc.) is received for a user within an enterprise, an enterprise (e.g., electronic message) server can request a usage license on behalf of the user using an issued delegation token. The user can grant the enterprise server permission to obtain a token by signing a consent form. When the user logs into the enterprise server, the protected content is available to the user with appropriate permission (even if the user hasn't separately provisioned). Thus in general, an enterprise does not have to provision all employees in order to consuming protected information. A few provisioned policy enforcement principals can serve the whole enterprise for the consumption of protected content.

Embodiments further enable enterprise central control. After an enterprise obtains a usage license on behalf of its employee, it can decrypt the protected information, obtain the permission granted and audit the message.

Embodiments additionally enable delegation to individual policy enforcement identity. For example, one employee can delegate their permission to access a specific content to another employee by signing the other employee's policy enforcement identity with their authorization identity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method at an authorization server including one or more processors and system memory for issuing a usage license for protected content directed to an authorization principal, the method comprising:

an act of the authorization server receiving a usage license request from a policy enforcement principal on behalf of the authorization principal, the usage license request requesting a usage license for the authorization principal to access the protected content, the usage license request including:

an authorization identity statement for the authorization principal, the authorization identity statement containing identity information identifying the authorization principal; and a policy enforcement certificate, the policy enforcement certificate containing a policy enforcement identity statement and a cryptographic key, the policy enforcement identity statement containing identity information identifying the policy enforcement principal, the cryptographic key provisioned for the policy enforcement principal;

an act of the authorization server accessing coupling information, the coupling information usable to determine that the policy enforcement principal is coupled to the authorization principal and that the policy enforcement principal is trusted to request a usage license on behalf of the authorization principal;

an act of the authorization server accessing a usage policy for the protected content;

an act of the authorization server verifying that the policy enforcement principal is permitted to request the usage license on behalf of the authorization principal based on the coupling information which includes at least one of an enterprise-wide coupling policy, an individual consent policy or a delegation token from a trusted authority, or by verifying that the policy enforcement identity statement was signed with a key held by the authorization principal;

an act of the authorization server verifying that unwanted permission elevation is not to occur based on the coupling between the policy enforcement principal and the authorization principal;

an act of the authorization server formulating a usage license by evaluating the authorization principal against contents of the usage policy, the usage license including permissions granted to the authorization principal and a content key;

an act of the authorization server encrypting the usage license, including encrypting the granted permissions and the content key with the cryptographic key provisioned for the policy enforcement principal; and an act of the authorization server returning the encrypted usage license to the policy enforcement principal.

2. The method as recited in claim 1, wherein the authorization identity statement for the authorization principal is authorization identity statement in the format of one of: a Security Assertion Markup Language ("SAML") token, an eXtensible Rights Markup Language ("XrML") certificate, an X.509 certificate, or a Kerberos token.

3. The method as recited in claim 1, wherein the policy enforcement certificate was provisioned from a Rights Management System ("RMS").

4. The method as recited in claim 1, wherein the act of accessing coupling information comprises an act of accessing coupling information included in the usage license request.

5. The method as recited in claim 1, wherein the act of accessing coupling information comprises an act of accessing coupling information from a directory, the coupling information having been previously saved to the directory.

6. The method as recited in claim 1, wherein the act of verifying that the policy enforcement principal is permitted to request the usage license on behalf of the authorization principal based on the coupling information comprises an act of verifying that the policy enforcement principal is permitted to request the usage license on behalf of the authorization principal through reference to the individual consent policy.

7. The method as recited in claim 1, wherein the act of verifying that the policy enforcement principal is permitted to request the usage license on behalf of the authorization principal based on the coupling information comprises verifying that the policy enforcement principal is permitted to request the usage license on behalf of the authorization principal by verifying the existence of the delegation token.

8. The method as recited in claim 1, wherein the act of verifying that the policy enforcement principal is permitted to request the usage license on behalf of the authorization principal based on the coupling information comprises an act of verifying that the policy enforcement principal is permitted to request the usage license on behalf of the authorization principal by verifying that the policy enforcement identity statement was signed with the key held by the authorization principal.

9. The method as recited in claim 1, wherein the act of verifying that unwanted permission elevation is not to occur based on the coupling between the policy enforcement principal and the authorization principal comprises an act of verifying that the authorization principal has a CanDelegate permission.

10. The method as recited in claim 1, wherein the act of verifying that unwanted permission elevation is not to occur based on the coupling between the policy enforcement principal and the authorization principal comprises an act of verifying that the policy enforcement principal has an ActAs permission, the ActAs permission included in an authorization form submitted by the authorization principal, the authorization form delegating content requests for the authorization principal to the policy enforcement principal.

11. A computer program product for use at an authorization server, the computer program product for implementing a method for issuing a usage license for protected content directed to an authorization principal, the computer program product comprising one or more computer storage devices having stored thereon computer-executable instructions that, when executed at a processor, cause the authorization server to perform the method, including the following:
receive a usage license request from a policy enforcement principal on behalf of the authorization principal, the usage license request requesting a usage license for the authorization principal to access the protected content, the usage license request including:
an authorization identity statement for the authorization principal, the authorization identity statement containing identity information identifying the authorization principal; and
a policy enforcement certificate, the policy enforcement certificate containing a policy enforcement identity statement and a cryptographic key, the policy enforcement identity statement containing identity information identifying the policy enforcement principal, the cryptographic key provisioned for the policy enforcement principal;
access coupling information, the coupling information usable to determine that the policy enforcement principal is coupled to the authorization principal and that the policy enforcement principal is trusted to request a usage license on behalf of the authorization principal;
access a usage policy for the protected content;
verify that the policy enforcement principal is permitted to request the usage license on behalf of the authorization principal based on the coupling information which includes at least one of an enterprise-wide coupling policy, an individual consent policy or a delegation token from a trusted authority, or by verifying that the policy enforcement identity statement was signed with a key held by the authorization principal;
verify that unwanted permission elevation is not to occur based on the coupling between the policy enforcement principal and the authorization principal;
formulate a usage license by evaluating the authorization principal to contents of the usage policy, the usage license including permissions granted to the authorization principal and a content key;
encrypt the usage license, including encrypting the granted permissions and the content key with the cryptographic key provisioned for the policy enforcement principal; and
returning the encrypted usage license to the policy enforcement principal.

12. The computer program product as recited in claim 11, wherein the coupling information is included in the usage license request.

13. The computer program product as recited in claim 11, wherein the policy enforcement certificate was provisioned from a Rights Management System ("RMS").

14. The computer program product as recited in claim 11, wherein computer-executable instructions that, when executed, cause the authorization server to verify that the policy enforcement principal is permitted to request the usage license on behalf of the authorization principal based on the coupling information comprise computer-executable instructions that, when executed, cause the authorization server to verifying that the policy enforcement principal is permitted to request the usage license on behalf of the authorization principal through reference to the enterprise-wide coupling policy.

15. The computer program product as recited in claim 11, wherein computer-executable instructions that, when executed, cause the authorization server to verify that the policy enforcement principal is permitted to request the usage license on behalf of the authorization principal based on the coupling information comprise computer-executable instructions that, when executed, cause the authorization server to verifying that the policy enforcement principal is permitted to request the usage license on behalf of the authorization principal by verifying the existence of the delegation token.

16. The computer program product as recited in claim 11, wherein computer-executable instructions that, when executed, cause the authorization server to verify that the policy enforcement principal is permitted to request the usage license on behalf of the authorization principal based on the coupling information comprise computer-executable instructions that, when executed, cause the authorization server to verify that the policy enforcement principal is permitted to request the usage license on behalf of the authorization principal by verifying that the policy enforcement identity statement was signed with the key held by the authorization principal.

17. The computer program product as recited in claim 11, wherein computer-executable instructions that, when executed, cause the authorization server to verify that unwanted permission elevation is not to occur based on the coupling between the policy enforcement principal and the authorization principal comprises computer-executable instructions that, when executed, cause the authorization server to verify that the authorization principal has a CanDelegate permission.

18. The computer program product as recited in claim 11, wherein computer-executable instructions that, when executed, cause the authorization server to verify that unwanted permission elevation is not to occur based on the coupling between the policy enforcement principal and the authorization principal comprises computer-executable instructions that, when executed, cause the authorization server to verify that the policy enforcement principal has an ActAs permission.

19. A computer system, the computer system comprising:
one or more processors;
system memory;

one or more computer storage devices having stored thereon computer-executable instructions representing a content publisher, an authorization principal, a policy enforcement principal, and an authorization server, wherein the content publisher is configured to:

publish a protected content;

publish a usage policy for protecting the protected content, the usage policy define rights the authorization principal has in the protected content and a content key used to encrypt and decrypt the protected content; and send the protected content to the authorization principal;

wherein the policy enforcement principal is configured to:

receive content directed to the authorization principal, including the protected content sent from the content publisher;

request a usage license request from the authorization server on behalf of an authorization principal, the usage license request requesting a usage license for the authorization principal to access the protected content, the usage license request including:

an authorization identity statement for the authorization principal, the authorization identity statement containing identity information identifying the authorization principal; and     a policy enforcement certificate, the policy enforcement certificate containing a policy enforcement identity statement and a cryptographic key, the policy enforcement identity statement containing identity information identifying the policy enforcement principal, the cryptographic key provisioned for the policy enforcement principal;

wherein the authorization server is configured to receive the usage license request from the policy enforcement principal on behalf of an authorization principal;

access coupling information, the coupling information usable to determine that the policy enforcement principal is coupled to the authorization principal and that the policy enforcement principal is trusted to request a usage license on behalf of the authorization principal;

access the usage policy for the protected content;

verify that the policy enforcement principal is permitted to request the usage license on behalf of the authorization principal based on the coupling information which includes at least one of an enterprise-wide coupling policy, an individual consent policy or a delegation token from a trusted authority, or by verifying that the policy enforcement identity statement was signed with a key held by the authorization principal;

verify that unwanted permission elevation is not to occur based on the coupling between the policy enforcement principal and the authorization principal;

formulate a usage license for the authorization principal by evaluating the authorization identity to the contents of the usage policy, the usage license including the rights defined for the authorization principal and a content key;

encrypt the usage license, including encrypting the granted permissions and the content key with the cryptographic key provisioned for the policy enforcement principal;

returning the encrypted usage license to the policy enforcement principal;

wherein the policy enforcement principal is further configured to:

receive the encrypted usage license from the authorization server;

decrypt the encrypted usage license using the cryptographic key provisioned for the policy enforcement principal; and     permit the authorization principal to access the protected content in accordance with the usage license.

20. The computer system as recited in claim 19, wherein the protected content is an electronic message, the electronic message selected from among: an electronic mail message, a voice mail message, a Short Message Service ("SMS") message, or voice mail/SMS message.

\* \* \* \* \*